United States Patent
Wang et al.

(10) Patent No.: US 12,298,074 B2
(45) Date of Patent: May 13, 2025

(54) REFRIGERATING AND FREEZING DEVICE

(71) Applicants: HAIER SMART HOME CO., LTD., Shandong (CN); QINGDAO HAIER SPECIAL REFRIGERATION ELECTRIC APPLIANCE CO., LTD., Shandong (CN)

(72) Inventors: Haijuan Wang, Qingdao (CN); Peng Li, Qingdao (CN); Kunkun Zhao, Qingdao (CN); Sen Mu, Qingdao (CN)

(73) Assignees: HAIER SMART HOME CO., LTD., Shandong (CN); QINGDAO HAIER SPECIAL REFRIGERATION ELECTRIC APPLIANCE CO., LTD., Shandong (CN)

( * ) Notice: Subject to any disclaimer, the term of this patent is extended or adjusted under 35 U.S.C. 154(b) by 669 days.

(21) Appl. No.: 17/420,590

(22) PCT Filed: Dec. 12, 2019

(86) PCT No.: PCT/CN2019/124873
§ 371 (c)(1),
(2) Date: Jul. 2, 2021

(87) PCT Pub. No.: WO2020/140722
PCT Pub. Date: Jul. 9, 2020

(65) Prior Publication Data
US 2022/0079191 A1 Mar. 17, 2022

(30) Foreign Application Priority Data
Jan. 4, 2019 (CN) .................. 201920013449.X (51) Int. Cl.
*F25D 31/00* (2006.01)
*F25D 23/12* (2006.01)
*H05B 6/12* (2006.01)

(52) U.S. Cl.
CPC .......... *F25D 31/005* (2013.01); *F25D 23/12* (2013.01); *H05B 6/12* (2013.01); *F25D 2400/40* (2013.01)

(58) Field of Classification Search
None
See application file for complete search history.

(56) References Cited

U.S. PATENT DOCUMENTS 4,296,298 A * 10/1981 MacMaster ............ H05B 6/54
219/771
4,392,357 A * 7/1983 Kinsey .................. F25D 21/004
62/155

(Continued)

FOREIGN PATENT DOCUMENTS

| CA | 2255689 A1 * | 9/1999 | |
| CN | 1087418 A * | 6/1994 | ............ F25D 29/00 |

(Continued)

OTHER PUBLICATIONS

JP2003336855A English Machine Translation (Year: 2003).*

(Continued)

*Primary Examiner* — Jenna M Maroney
(74) *Attorney, Agent, or Firm* — ALSTON & BIRD LLP (57) ABSTRACT

A refrigerating and freezing device (200) includes a cabinet defining at least one storage compartment, a refrigerating system configured to provide cooling capacity to the at least one storage compartment, and a heating unit (100). The heating unit (100) includes a metal container body (110) disposed in one storage compartment, a door body (120) configured to open and close a pick-and-place opening of the metal container body (110), and an electromagnetic generating system generating electromagnetic waves in the metal container body (110) to heat an object to be processed. At least a part of the electromagnetic generating system is disposed in the metal container body (110) or accessed into (Continued)

the metal container body (110). The metal container body (110) is configured to be grounded to discharge the high-voltage electrostatic charges on the metal container body (110).

5 Claims, 8 Drawing Sheets

(56) References Cited

U.S. PATENT DOCUMENTS

| | | | | |
|---|---|---|---|---|
| 5,856,656 | A * | 1/1999 | Kim | H05B 6/66 361/753 |
| 8,572,990 | B2 | 11/2013 | Chung et al. | |
| 2003/0005720 | A1* | 1/2003 | Lee | F25D 23/003 62/506 |
| 2013/0160467 | A1* | 6/2013 | Hall | F25D 31/005 62/3.1 |
| 2016/0150602 | A1* | 5/2016 | Bilet | B65D 81/3453 219/730 |
| 2019/0271497 | A1* | 9/2019 | Guanye | F25B 5/00 |
| 2020/0318871 | A1* | 10/2020 | Sung | F25D 23/003 |
| 2021/0037620 | A1* | 2/2021 | Sakamoto | H05B 6/686 |
| 2021/0381755 | A1* | 12/2021 | Mori | F25D 31/005 |
| 2022/0079191 | A1* | 3/2022 | Wang | A23L 3/363 |
| 2022/0086963 | A1* | 3/2022 | Wang | H05B 6/12 |
| 2022/0086968 | A1* | 3/2022 | Zhang | H05B 6/688 |
| 2022/0086969 | A1* | 3/2022 | Wang | F24C 15/16 |
| 2022/0086972 | A1* | 3/2022 | Wang | H05B 6/50 |
| 2022/0086973 | A1* | 3/2022 | Wang | F25D 23/12 |
| 2022/0099361 | A1* | 3/2022 | Wang | H05B 6/688 |
| 2022/0104318 | A1* | 3/2022 | Wang | H05B 6/62 |
| 2022/0107130 | A1* | 4/2022 | Wang | F25D 29/005 |
| 2022/0117050 | A1* | 4/2022 | Wang | A23L 3/001 |
| 2022/0120496 | A1* | 4/2022 | Wang | F25D 31/005 |
| 2022/0120497 | A1* | 4/2022 | Wang | F25D 23/12 |
| 2023/0300957 | A1* | 9/2023 | Wang | H05B 6/763 219/678 |

FOREIGN PATENT DOCUMENTS

| | | | | |
|---|---|---|---|---|
| CN | 2503634 | Y * | 7/2002 | |
| CN | 101044680 | A * | 9/2007 | E05F 15/46 |
| CN | 201829940 | U * | 5/2011 | |
| CN | 101044680 | B * | 5/2012 | E05F 15/46 |
| CN | 202998534 | U * | 6/2013 | |
| CN | 204063776 | U | 12/2014 | |
| CN | 105452788 | A * | 3/2016 | E05D 11/0081 |
| CN | 106288626 | A | 1/2017 | |
| CN | 106885399 | A * | 6/2017 | F25B 39/04 |
| CN | 207081264 | U | 3/2018 | |
| CN | 207081265 | U | 3/2018 | |
| CN | 207095130 | U | 3/2018 | |
| CN | 207095131 | U | 3/2018 | |
| CN | 207095160 | U | 3/2018 | |
| CN | 207247701 | U * | 4/2018 | |
| CN | 207247702 | U | 4/2018 | |
| CN | 108266959 | A * | 7/2018 | F25D 19/00 |
| CN | 108302891 | A * | 7/2018 | F25D 29/00 |
| CN | 207881331 | U | 9/2018 | |
| CN | 109000396 | A * | 12/2018 | A23L 3/365 |
| CN | 109000400 | A * | 12/2018 | F25D 11/02 |
| CN | 109000401 | A | 12/2018 | |
| CN | 109000402 | A | 12/2018 | |
| CN | 109000403 | A | 12/2018 | |
| CN | 109000404 | A | 12/2018 | |
| CN | 109000405 | A | 12/2018 | |
| CN | 109000408 | A | 12/2018 | |
| CN | 109000418 | A * | 12/2018 | F25D 11/02 |
| CN | 109259045 | A * | 1/2019 | A23L 3/365 |
| CN | 109990554 | A * | 7/2019 | |
| CN | 209893774 | U * | 1/2020 | A23B 4/066 |
| CN | 112648775 | A * | 4/2021 | A23L 3/365 |
| CN | 213029670 | U * | 4/2021 | |
| CN | 113498225 | A * | 10/2021 | |
| CN | 114076497 | A * | 2/2022 | |
| DE | 3149410 | A1 | 7/1982 | |
| EP | 1541948 | B1 * | 10/2017 | F25D 23/003 |
| EP | 3481148 | B1 * | 7/2021 | A23L 3/365 |
| JP | S57210278 | A | 12/1982 | |
| JP | H10304860 | A * | 11/1998 | |
| JP | 2003336855 | A * | 11/2003 | |
| JP | 4445594 | B2 * | 4/2010 | A23L 3/26 |
| KR | 20130094024 | A | 8/2013 | |
| RU | 2332622 | C2 | 8/2008 | |
| WO | WO-2017141826 | A1 * | 8/2017 | F24C 7/02 |
| WO | WO 2018/225597 | A1 | 12/2018 | |
| WO | WO-2019193748 | A1 * | 10/2019 | H05B 6/6438 |
| WO | WO-2020140989 | A1 * | 7/2020 | A23L 3/365 |
| WO | WO-2020151596 | A1 * | 7/2020 | A23L 3/365 |
| WO | WO-2022130915 | A1 * | 6/2022 | |

OTHER PUBLICATIONS

Your Dictionary—Electromagnetic Generating Module Search—Jun. 12, 2024 (Year: 2024).*
Wiley Encyclopedia of Electrical and Electronics Engineering—Electromagnetic Generating Module Search—Jun. 12, 2024 (Year: 2024 ).*
OED—Electromagnetic Generating Module Search—Jun. 12, 2024 (Year: 2024).*
Merriam-Webster Dictionary—Electromagnetic Generating Module Search—Jun. 12, 2024 (Year: 2024).*
Credo Reference—Electromagnetic Generating Module Search—Jun. 12, 2024 (Year: 2024).*
CN-202998534-U—English Machine Translation (Year: 2013).*
International Search Report for PCT/CN2019/124658 (ISA/CN) mailed Feb. 25, 2020 (7 pages).
Supplementary European Search Report for EP Application No. 19906611.9 dated Jan. 31, 2022 (4 pages).
Russian Search Report for Russia Application No. 2021133168 dated Dec. 27, 2021 (4 pages).
1st Office Action for EP Application No. 19906611.9 dated Feb. 11, 2022 (5 pages).
2nd Office Action for EP Application No. 19906611.9 dated Jul. 4, 2022 (7 pages).
1st Office Action for Russia Application No. 2021122168/10(046375) dated Dec. 28, 2021 (8 pages).
1st Office Action for India Application No. 202137033240 dated Jul. 28, 2022 (6 pages).
1st Office Action for Australia Application No. 2019418577 dated Apr. 8, 2022 (2 pages).

* cited by examiner

REFRIGERATING AND FREEZING DEVICE

TECHNICAL FIELD

The present invention relates to kitchen appliances, and particularly relates to a refrigerating and freezing device with an electromagnetic wave heating unit.

BACKGROUND ART

In the freezing process of food, the quality of the food is maintained, but the frozen food needs to be thawed before processing or eating. In order to facilitate users freezing and thawing the food, in the prior art, the food is generally thawed by an electromagnetic wave device.

However, when the electromagnetic wave device works, a high-voltage electromagnetic field is formed in a chamber of the electromagnetic wave device, which easily causes potential safety hazards. By comprehensive consideration, a refrigerating and freezing device, which has an electromagnetic wave heating unit, with a high safety coefficient is required in design.

SUMMARY OF THE INVENTION

An objective of the present invention is to provide a refrigerating and freezing device with a high safety coefficient.

A further objective of the present invention is to improve the heating efficiency.

Specifically, the present invention provides a refrigerating and freezing device, including:
- a cabinet, defining at least one storage compartment;
- a refrigerating system, configured to provide cooling capacity to the at least one storage compartment; and
- a heating unit, wherein the heating unit includes:
- a metal container body, disposed in one of the storage compartments and provided with an pick-and-place opening;
- a door body, disposed at the pick-and-place opening and configured to open and close the pick-and-place opening; and
- an electromagnetic generating system, at least a part of which is disposed in the metal container body or accessed into the metal container body, so as to generate electromagnetic waves in the metal container body to heat an object to be processed, wherein the metal container body is configured to be grounded.

Optionally, the cabinet includes an inner liner, a shell and an insulating layer disposed between the inner liner and the shell, and the shell includes bottom steel disposed at a bottom of the insulating layer; and the refrigerating and freezing device further includes:
- a power line, configured to receive commercial power and supply power to the refrigerating system, and the power line including a grounding wire connected with a ground wire in the commercial power and conductively connected with the bottom steel; and
- a lead wire, one end of which is configured to be conductively connected with the metal container body, and the other end of which is configured to be conductively connected with the bottom steel.

Optionally, the bottom steel defines a compressor chamber configured to place a compressor of the refrigerating system; and
the lead wire is disposed in the insulating layer in advance, and passes through the inner liner and the bottom steel to reserve wiring terminals respectively in the storage compartment where the metal container body is located and the compressor chamber.

Optionally, the wiring terminals are configured to be respectively fixed to and conductively connected with the metal container body and the bottom steel by fasteners.

Optionally, the electromagnetic generating system includes:
- an electromagnetic generating module, configured to generate an electromagnetic wave signal; and
- a radiating antenna, disposed in the metal container body and electrically connected with the electromagnetic generating module to generate electromagnetic waves of a corresponding frequency in the metal container body according to the electromagnetic wave signal.

Optionally, the electromagnetic generating module is disposed in the compressor chamber to facilitate heat dissipation of the electromagnetic generating module.

Optionally, the refrigerating and freezing device further includes:
- a heat dissipation fin, configured to be thermally connected with the electromagnetic generating module to increase a heat dissipation area of the electromagnetic generating module; and
- two lateral side walls of the compressor chamber being respectively provided with an air vent to allow ambient air to enter the compressor chamber and exchange heat with the electromagnetic generating module and the heat dissipation fin.

Optionally, the refrigerating and freezing device further includes:
- a signal processing and measurement and control circuit, including:
- a detection unit, connected in series between the electromagnetic generating module and the radiating antenna, and configured to detect specific parameters of an incident wave signal and a reflected wave signal passing through the detection unit;
- a control unit, configured to calculate an electromagnetic wave absorption rate of the object to be processed according to the specific parameters; and
- a matching unit, connected in series between the electromagnetic generating module and the radiating antenna, and configured to adjust a load impedance of the electromagnetic generating module according to the electromagnetic wave absorption rate.

Optionally, the signal processing and measurement and control circuit is integrated on a circuit board, and the circuit board is configured to be conductively connected with the metal container body.

Optionally, the circuit board and the radiating antenna are disposed in parallel to facilitate an electrical connection between the signal processing and measurement and control circuit and the radiating antenna.

In the refrigerating and freezing device of the present invention, since the metal container body of the heating unit is grounded, high-voltage electrostatic charges on the metal container body may be discharged, thereby avoiding potential safety hazards.

Further, in the present invention, the electromagnetic generating module of the heating unit is disposed in the compressor chamber, and the heat dissipation fin is disposed for heat dissipation of the electromagnetic generating module, which can avoid an overheating damage of the electromagnetic generating module, thereby prolonging the service life and reducing the failure rate.

Further, in the present invention, the load impedance of the electromagnetic generating module is adjusted by the matching unit so as to improve a matching degree between the output impedance and the load impedance of the electromagnetic generating module, so that when foods with different fixed attributes (such as type, weight and volume) are placed in the heating chamber, or during the temperature change of the foods, relatively more electromagnetic wave energy is radiated in the heating chamber.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention are described in detail below with reference to the drawings by way of example and not limitation. The same reference numerals in the drawings indicate the same or similar components or parts. Those skilled in the art should understand that these drawings are not necessarily drawn in scale. In figures.

DETAILED DESCRIPTION OF THE INVENTION

Figure 1:
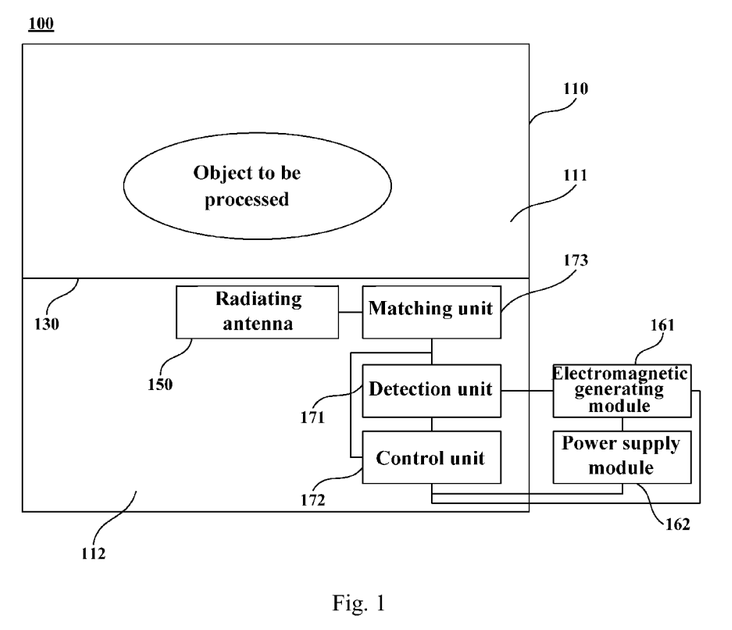
FIG. 1 is a schematic structural view of a heating unit according to one embodiment of the present invention.
Figure 2:
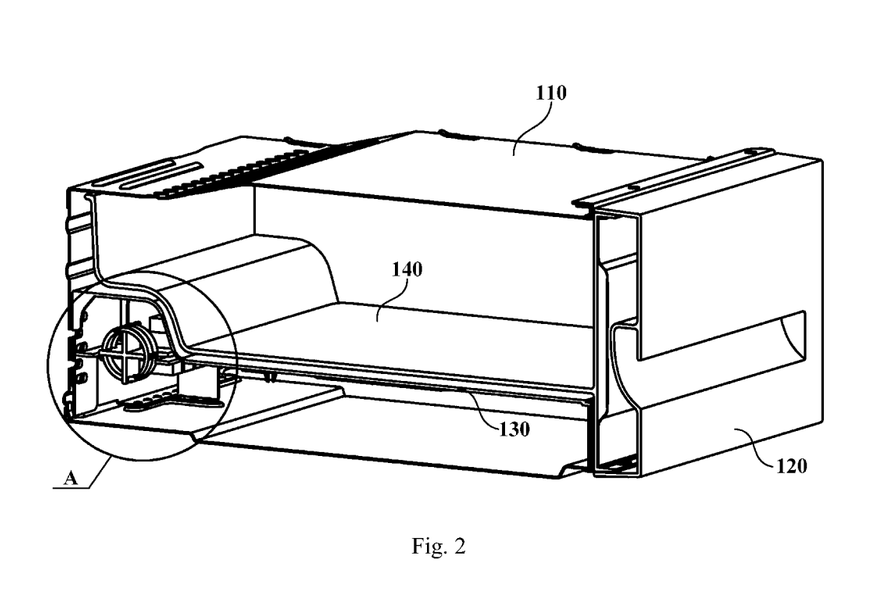
FIG. 2 is a schematic cross-sectional view of the heating unit as shown in FIG. 1, wherein an electromagnetic generating module and a power supply module are omitted.

FIG. 1 is a schematic structural view of a heating unit 100 according to one embodiment of the present invention. FIG. 2 is a schematic cross-sectional view of the heating unit 100 as shown in FIG. 1, wherein an electromagnetic generating module 161 and a power supply module 162 are omitted. Referring to FIG. 1 and FIG. 2, the heating unit 100 may include a metal container body 110, a door body 120 and an electromagnetic generating system.

The metal container body 110 may be configured to place an object to be processed, and a front wall or a top wall thereof may be provided with a pick-and-place opening for picking and placing the object to be processed.

The door body 120 may be installed together with the metal container body 110 by an appropriate method, such as a sliding rail connection, a hinged connection, etc., and is configured to open and close the pick-and-place opening. In an illustrated embodiment, the heating unit 100 also includes a drawer 140 for carrying the object to be processed; a front end plate of the drawer 140 is configured to be fixedly connected with the door body 120, and two lateral side plates of the drawer are movably connected with the metal container body 110 by sliding rails.

The electromagnetic generating system may be disposed such that at least a part thereof is disposed in the metal container body 110 or accessed into the metal container body 110, so as to generate electromagnetic waves in the metal container body 110 to heat the object to be processed in the metal container body 110.

The metal container body 110 and the door body 120 may be respectively provided with electromagnetic shielding features, so that the door body 120 is conductively connected with the metal container body 110 when the door body is in a closed state, so as to prevent electromagnetic leakage.

In some embodiments, the electromagnetic generating system may include an electromagnetic generating module 161, a power supply module 162 and a radiating antenna 150.

The power supply module 162 may be configured to be electrically connected with the electromagnetic generating module 161 to provide electric energy to the electromagnetic generating module 161, so that the electromagnetic generating module 161 generates electromagnetic wave signals. The radiating antenna 150 may be disposed in the metal container body 110 and is electrically connected with the electromagnetic generating module 161 to generate electromagnetic waves of corresponding frequencies according to the electromagnetic wave signals, so as to heat the object to be processed in the metal container body 110.

In some embodiments, the metal container body 110 may be made of metals to serve as a receiving pole to receive electromagnetic waves generated by the radiating antenna 150. In some other embodiments, a receiving pole plate may be disposed on the top wall of the metal container body 110 to receive electromagnetic waves generated by the radiating antenna 150.

Figure 4:
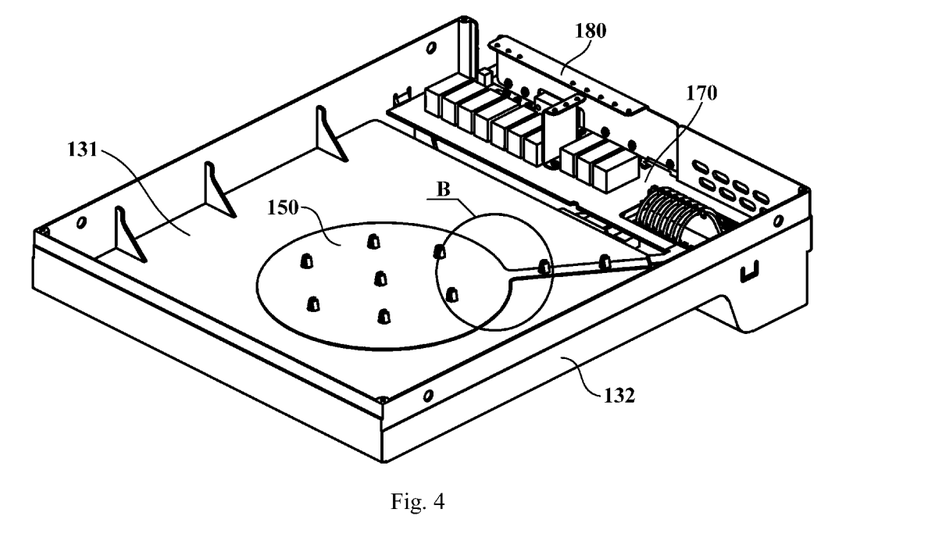
FIG. 4 is a schematic structural view of an electrical appliance chamber according to one embodiment of the present invention.
Figure 6:
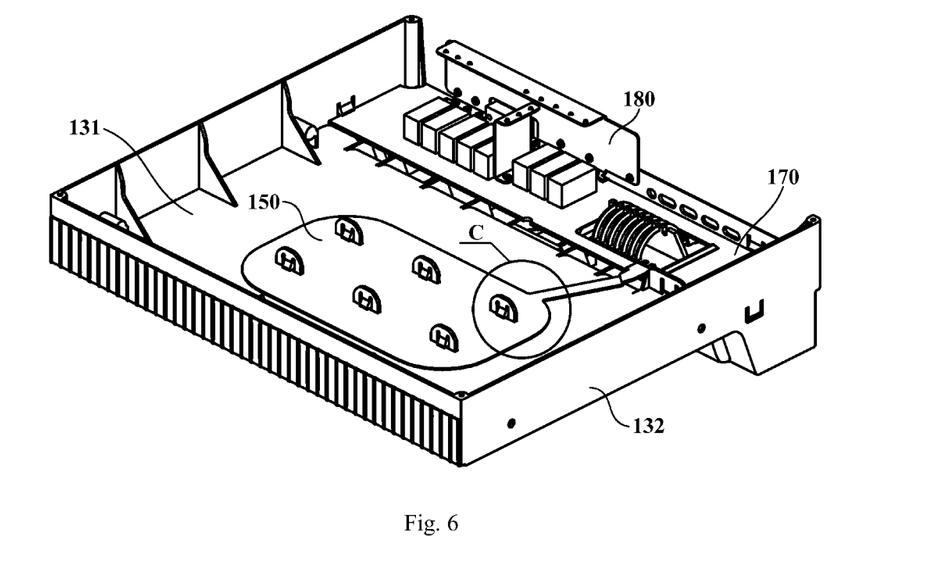
FIG. 6 is a schematic structural view of an electrical appliance chamber according to another embodiment of the present invention.

FIG. 4 is a schematic structural view of an electrical appliance chamber 112 according to one embodiment of the present invention. FIG. 6 is a schematic structural view of the electrical appliance chamber 112 according to another embodiment of the present invention. Referring to FIG. 4 and FIG. 6, the peripheral edge of the radiating antenna 150 may be formed by smooth curves, so as to make the distribution of electromagnetic waves in the metal container body 110 more uniform, thereby improving the temperature uniformity of the object to be processed. A smooth curve refers to a curve of which the first derivative of the curve equation is continuous, which means that the peripheral edge of the radiating antenna 150 has no sharp corner in engineering.

Referring to FIG. 2 and FIG. 4, the heating unit 100 may further include an antenna housing 130 to separate the inner space of the metal container body 110 into a heating chamber 111 and an electrical appliance chamber 112. The object to be processed and the radiating antenna 150 may be respectively disposed in the heating chamber 111 and the electrical appliance chamber 112 to separate the object to be processed from the radiating antenna 150, so as to prevent the radiating antenna 150 from being dirty or damaged by accidental touch.

In some embodiments, the antenna housing 130 may be made of an insulating material, so that the electromagnetic waves generated by the radiating antenna 150 may pass through the antenna housing 130 to heat the object to be processed. Further, the antenna housing 130 may be made of a non-transparent material to reduce the electromagnetic loss of electromagnetic waves at the antenna housing 130, thereby increasing the heating rate of the object to be processed. The above-mentioned non-transparent material is a translucent material or an opaque material. The non-transparent material may be a PP material, a PC material or an ABS material.

The antenna housing 130 may also be configured to fix the radiating antenna 150 to simplify the assembly process of the heating unit 100 and facilitate the positioning and installation of the radiating antenna 150. Specifically, the antenna housing 130 may include a clapboard 131 for separating the heating chamber 111 and the electrical appliance chamber 112, and a skirt part 132 fixedly connected with the inner wall of the metal container body 110, wherein the radiating antenna 150 may be configured to be fixedly connected with the clapboard 131.

Figure 5:
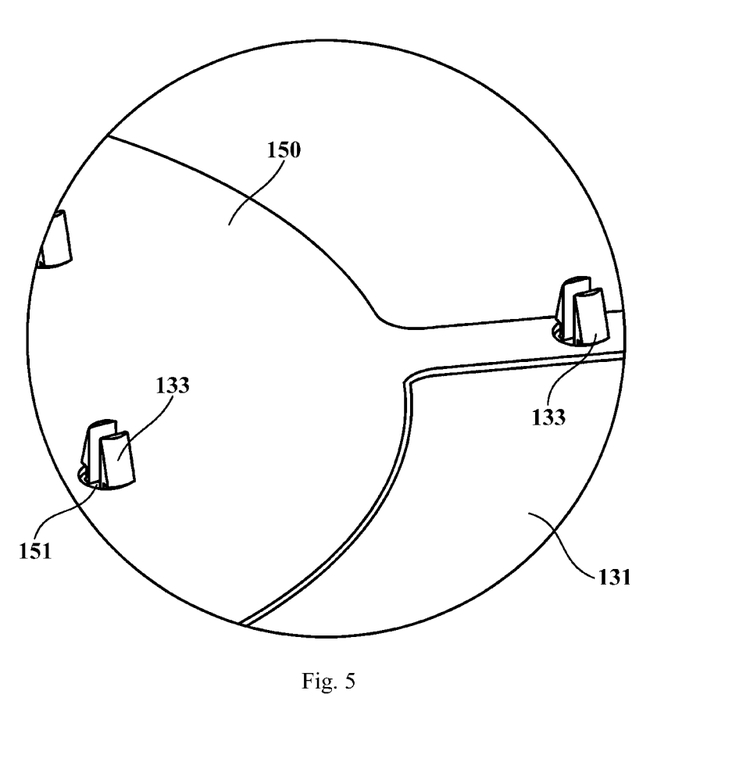
FIG. 5 is a schematic enlarged view of a region B in FIG. 4.

In some embodiments, the radiating antenna 150 may be configured to be engaged with the antenna housing 130. FIG. 5 is a schematic enlarged view of a region B in FIG. 4. Referring to FIG. 5, the radiating antenna 150 may be provided with a plurality of engaging holes 151; the antenna housing 130 may be correspondingly provided with a plurality of buckles 133; and the plurality of buckles 133 are configured to respectively pass through the plurality of engaging holes 151 to be engaged with the radiating antenna 150.

In one embodiment of the present invention, each of the buckles 133 may be composed of two barbs disposed at an interval and in mirror symmetry.

Figure 7:
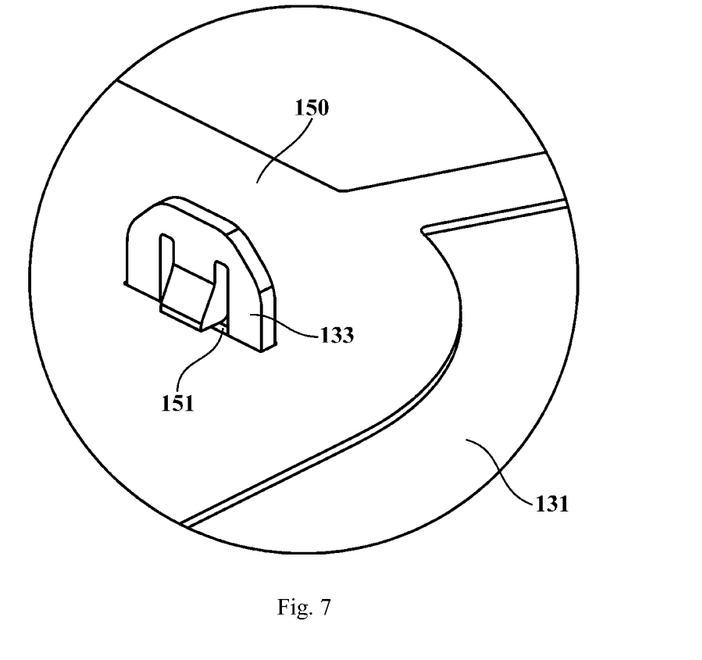
FIG. 7 is a schematic enlarged view of a region C in FIG. 6.

FIG. 7 is a schematic enlarged view of a region C in FIG. 6. Referring to FIG. 7, in another embodiment of the present invention, each of the buckles 133 may be composed of a fixing part perpendicular to the radiating antenna 150 and having a hollow middle part, and an elastic part extending inclining to the fixing part from the inner end edge of the fixing part and toward the antenna.

In some other embodiments, the radiating antenna 150 may be configured to be fixed to the antenna housing 130 through an electroplating process.

The antenna housing 130 may further include a plurality of reinforcing ribs, and the reinforcing ribs are configured to connect the clapboard 131 and the skirt part 132 so as to improve the structural strength of the antenna housing 130.

In some embodiments, the antenna housing 130 may be disposed at the bottom of the metal container body 110 to avoid the damage to the antenna housing 130 due to the fact that a user places an object to be processed with an excessive height. The radiating antenna 150 may be horizontally fixed on the lower surface of the clapboard 131.

The radiating antenna 150 may be disposed at the height of 1/3 to 1/2, such as 1/3, 2/5 or 1/2, of the metal container body 110, so that the volume of the heating chamber 111 is relatively large, and meanwhile, the electromagnetic waves in the heating chamber 111 have a relatively high energy density so as to make the object to be processed heated quickly.

Figure 3:
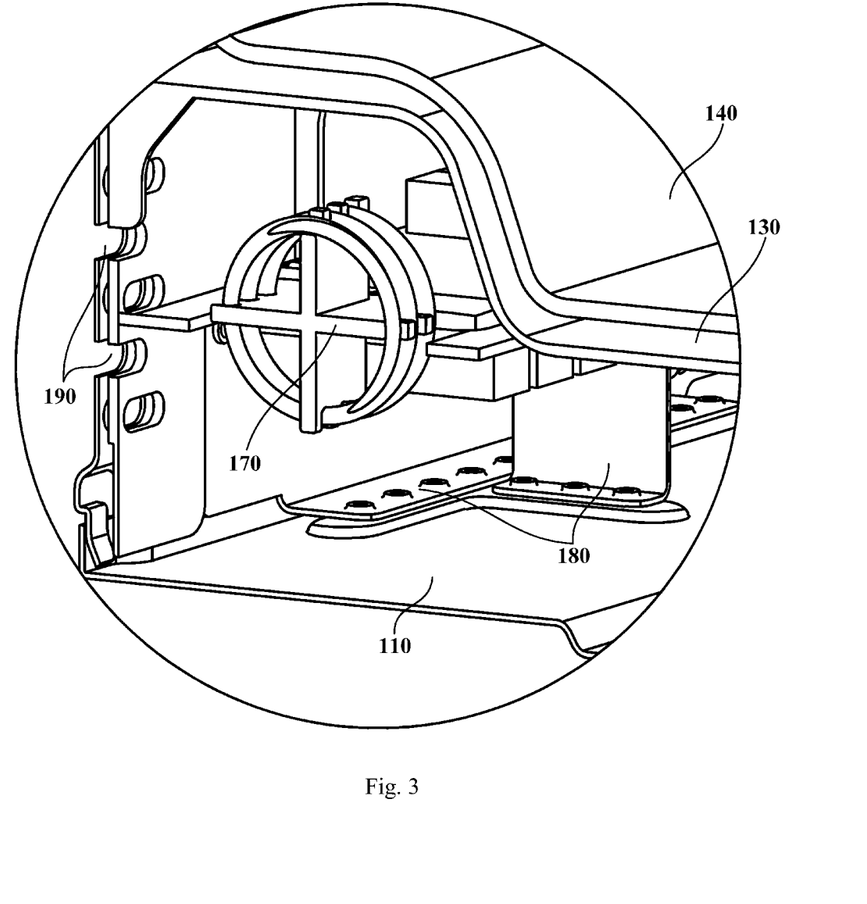
FIG. 3 is a schematic enlarged view of a region A in FIG. 2.

FIG. 3 is a schematic enlarged view of a region A in FIG. 2. referring to FIG. 1 to FIG. 3, the heating unit 100 may further include a signal processing and measurement and control circuit 170. Specifically, the signal processing and measurement and control circuit 170 may include a detection unit 171, a control unit 172 and a matching unit 173.

The detection unit 171 may be connected in series between the electromagnetic generating module 161 and the radiating antenna 150, and is configured to detect in real time the specific parameters of incident wave signals and reflected wave signals passing through the detection unit.

The control unit 172 may be configured to acquire the specific parameters from the detection unit 171, and calculate the power of incident waves and reflected waves according to the specific parameters. In the present invention, the specific parameters may be voltage values and/or current values.

The control unit 172 may further calculate an electromagnetic wave absorption rate of the object to be processed according to the power of incident waves and reflected waves, compare the electromagnetic wave absorption rate with a preset absorption threshold, and send an adjusting command to the matching unit 173 when the electromagnetic wave absorption rate is less than the preset absorption threshold. The preset absorption threshold may be 60% to 80%, such as 60%, 70% or 80%.

The matching unit 173 may be connected in series between the electromagnetic generating module 161 and the radiating antenna 150, and is configured to adjust a load impedance of the electromagnetic generating module 161 according to an adjusting command of the control unit 172, so as to improve the matching degree between the output impedance and the load impedance of the electromagnetic generating module 161, so that when foods with different fixed attributes (such as type, weight and volume) are placed in the heating chamber 111, or during the temperature change of the foods, relatively more electromagnetic wave energy is radiated in the heating chamber 111, thereby increasing the heating rate.

In some embodiments, the heating unit 100 may be used for thawing. The control unit 172 may also be configured to calculate an imaginary part change rate of a dielectric coefficient of the object to be processed according to the power of incident waves and reflected waves, compare the imaginary part change rate with a preset change threshold, and send a stop command to the electromagnetic generating module 161 when the imaginary part change rate of the dielectric coefficient of the object to be processed is greater than or equal to the preset change threshold, so that the electromagnetic generating module 161 stops working, and the thawing program is terminated.

The preset change threshold may be obtained by testing the imaginary part change rate of the dielectric coefficient of foods with different fixed attributes at −3° C. to 0° C., so that the foods have good shear strength. For example, when the object to be processed is raw beef, the preset change threshold may be set to be 2.

The control unit 172 may also be configured to receive a user command and control the electromagnetic generating module 161 to start working according to the user command, wherein the control unit 172 is configured to be electrically connected with the power supply module 162 to obtain electric energy from the power supply module 162 and to be always in a standby state.

In some embodiments, the signal processing and measurement and control circuit 170 may be integrated on a circuit board and disposed in parallel with the radiating antenna 150 to facilitate the electrical connection between the radiating antenna 150 and a matching module.

The antenna housing 130 and the metal container body 110 may be provided with heat dissipation holes 190 respectively in positions corresponding to the matching unit 173, so that the heat generated by the matching unit 173 during working is discharged through the heat dissipation holes 190. In some embodiments, the signal processing and measurement and control circuit 170 may be disposed on the rear side of the radiating antenna 150. The heat dissipation holes 190 may be formed in the rear walls of the antenna housing 130 and the metal container body 110.

In some embodiments, the metal container body 110 may be configured to be grounded to discharge the electric charges thereon, thereby improving the safety of the heating unit 100.

The heating unit 100 may further include a metal bracket 180. The metal bracket 180 may be configured to connect the circuit board and the metal container body 110 to support the circuit board and discharge the electric charges on the circuit board through the metal container body 110. In some embodiments, the metal bracket 180 may be composed of two parts perpendicular to each other.

Figure 8:
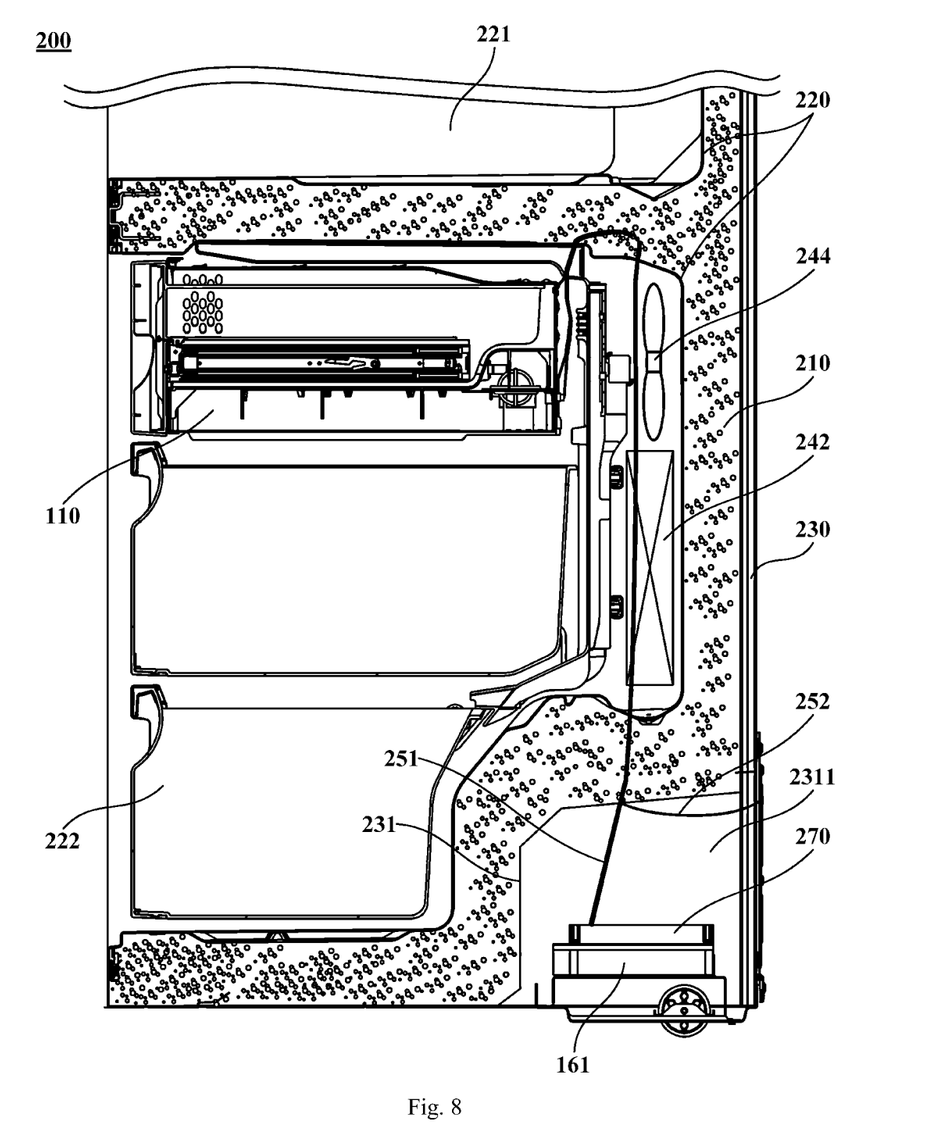
FIG. 8 is a schematic structural view of a refrigerating and freezing device according to one embodiment of the present invention.

Based on the heating unit 100 according to any one of the above embodiments, the present invention may further provide a refrigerating and freezing device 200. FIG. 8 is a schematic structural view of a refrigerating and freezing device 200 according to one embodiment of the present invention. Referring to FIG. 8, the refrigerating and freezing device 200 may include a cabinet defining at least one storage compartment, at least one cabinet door configured to respectively open and close the at least one storage compartment, and a refrigerating system configured to provide cooling capacity to the at least one storage compartment. The metal container body of the heating unit 100 may be disposed in one storage compartment. In the present invention, at least one means one, two, or more than two. The refrigerating and freezing device 200 may be a refrigerator or a freezer.

In an illustrated embodiment, there are two storage compartments, namely a refrigerating compartment 221 and a freezing compartment 222 disposed under the refrigerating compartment 221. The metal container body of the heating unit 100 is disposed in the freezing compartment 222.

The refrigerating system may include a compressor 241, a condenser 243, an evaporator 242, a refrigerating fan 244 for blowing the cooling capacity generated by the evaporator 242 into the freezing compartment 222, and a heat dissipation fan 245 for heat dissipation of the condenser 243.

The cabinet may include an inner liner 220, a shell 230 and an insulating layer 210 disposed between the inner liner 220 and the shell 230. The shell 230 may include two side panels respectively located on two lateral sides of the insulating layer 210, bottom steel 231 located at the bottom of the insulating layer 210, and a back plate located at the rear part of the insulating layer 210.

The refrigerating and freezing device 200 further includes a power line (not shown in the figure) for receiving commercial power, so as to supply power to the heating unit 100 and the refrigerating system. The power line may include a grounding wire which is connected with a ground wire in the commercial power and is conductively connected with the bottom steel 231, so as to prevent the electric leakage of the refrigerating and freezing device 200.

Figure 9:
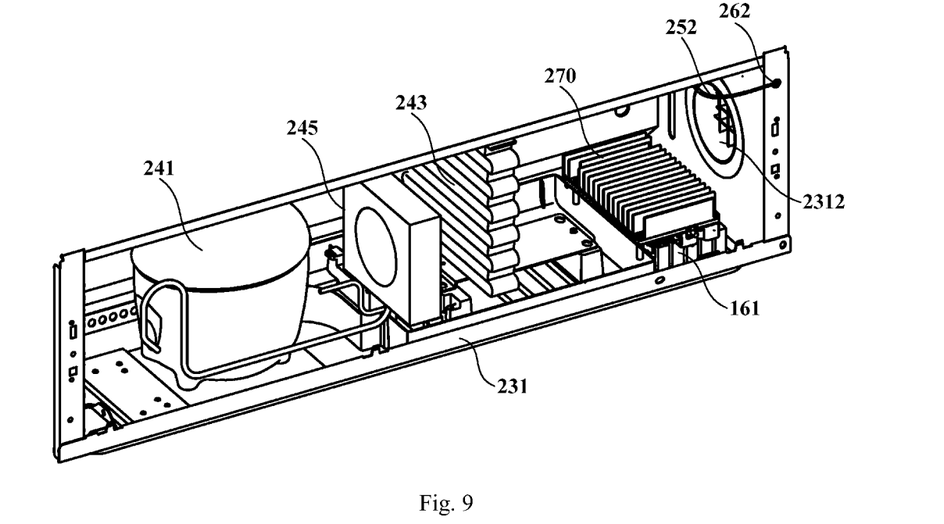
FIG. 9 is a schematic structural view of a compressor chamber in FIG. 8.

FIG. 9 is a schematic structural view of a compressor chamber 2311 in FIG. 8. Referring to FIG. 9, the bottom steel 231 defines a compressor chamber 2311, and the compressor 241, the condenser 243 and the heat dissipation fan 245 may be disposed in the compressor chamber 2311. Two lateral side walls of the compressor chamber 2311 may be respectively provided with an air vent 2312 to allow ambient air to enter the compressor chamber 2311 to dissipate heat from the condenser 243 and the compressor 241.

In some embodiments, the electromagnetic generating module 161 may be disposed in the compressor chamber 2311 to use the heat dissipation fan 245 to dissipate heat from the electromagnetic generating module 161. A heat dissipation fin 270 may also be disposed in the compressor chamber 2311 and is disposed above the electromagnetic generating module 161 and thermally connected with the electromagnetic generating module 161, so as to increase the heat dissipation area of the electromagnetic generating module 161 and improve the heat dissipation efficiency of the electromagnetic generating module 161.

Figure 10:
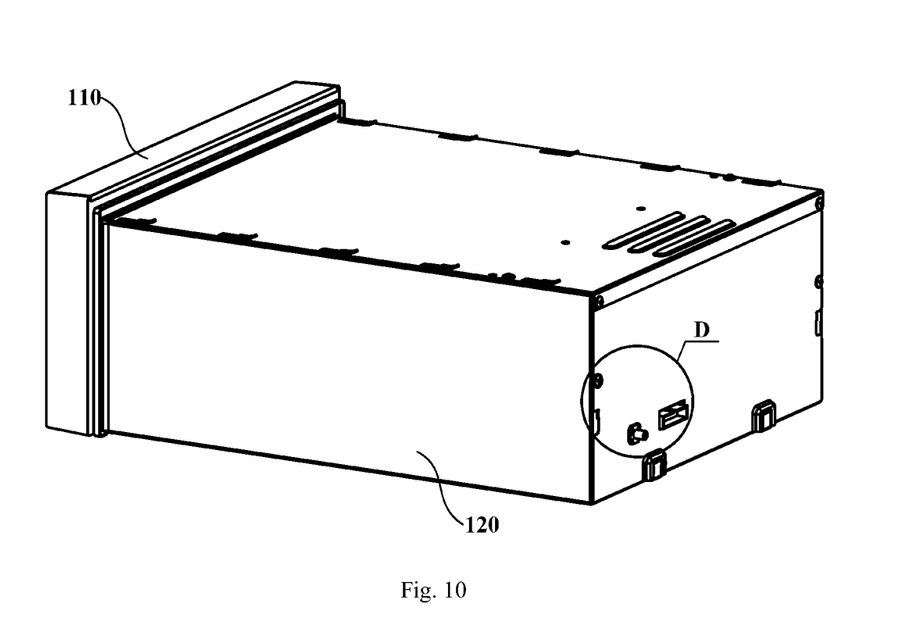
FIG. 10 is a schematic structural view of a part of a heating unit located in a storage compartment when viewed from the rear to the front.
Figure 11:
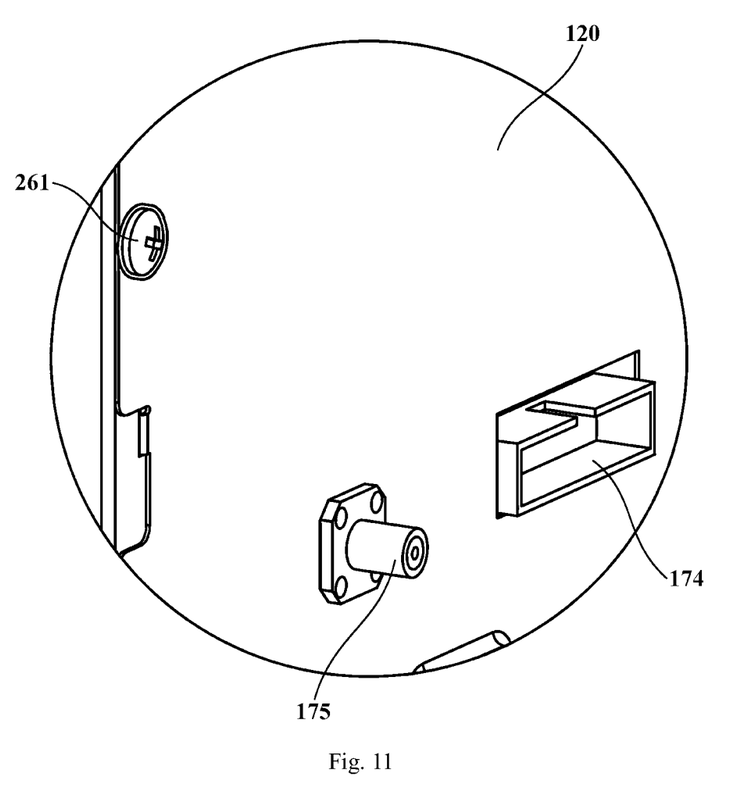
FIG. 11 is a schematic enlarged view of a region D in FIG. 10.

FIG. 10 is a schematic structural view of a part of a heating unit located in a storage compartment when viewed from the rear to the front. FIG. 11 is a schematic enlarged view of a region D in FIG. 10. Referring to FIG. 4, FIG. 10 and FIG. 11, a part of the metal bracket 180 may be disposed at the rear part of the circuit board and extend vertically along a lateral direction, and it may be provided with two wiring ports, so that a wiring terminal 175 of the detection unit 171 (or the matching unit 173) and a wiring terminal 174 of the control unit 172 respectively extend out from a wiring port, and are electrically connected with the electromagnetic generating module 161 through a signal transmission wire 251.

Specifically, the metal container body 110 may be conductively connected with the bottom steel 231 through a lead wire 252 to guide the electric charges thereon to the bottom steel 231 so as to avoid potential safety hazards.

The signal transmission wire 251 and the lead wire 252 may be disposed in the insulating layer 210 in advance, and pass through the inner liner 220 and the bottom steel 231 to respectively reserve wiring terminals in the freezing compartment 222 and the compressor chamber 2311, so that the signal transmission wire 251 and the lead wire 252 may be routed together so as to save the assembly cost.

Two wiring terminals of the lead wire 252 may be conductively connected with the metal container body 110 and the bottom steel 231 respectively by a fastener 261 and a fastener 262. During assembly, a stable and reliable conductive connection of the lead wire 252 with the metal container body 110 and the bottom steel 231 can be realized only by tightening the fasteners.

Hereto, those skilled in the art should realize that although multiple exemplary embodiments of the present invention have been shown and described in detail herein, without departing from the spirit and scope of the present invention, many other variations or modifications that conform to the principles of the present invention can still be directly determined or deduced from the contents disclosed in the present invention. Therefore, the scope of the present invention should be understood and recognized as covering all these other variations or modifications.

The invention claimed is:
1. A refrigerating and freezing device, comprising:
 a cabinet, defining at least one storage compartment;
 a refrigerating system, configured to provide cooling capacity to the at least one storage compartment; and
 a heating unit, wherein the heating unit comprises:
 a metal container body, disposed in one of the storage compartments and provided with an opening; and
 a door body, disposed at the opening and configured to open and close the opening;

wherein at least part of the heating unit is disposed in the metal container body or accessed into the metal container body and configured to generate electromagnetic waves in the metal container body to heat an object to be processed, wherein the metal container body is configured to be grounded;

wherein the cabinet comprises an inner liner, a shell and an insulating layer disposed between the inner liner and the shell, and the shell comprises bottom steel disposed at a bottom of the insulating layer; and the refrigerating and freezing device further comprises:

a lead wire, one end of which is configured to be conductively connected with the metal container body, and the other end of which is configured to be conductively connected with the bottom steel;

wherein the bottom steel defines a compressor chamber configured to place a compressor of the refrigerating system; and the lead wire is disposed in the insulating layer in advance and passes through the inner liner and the bottom steel to reserve wiring terminals respectively in the storage compartment where the metal container body is located and the compressor chamber.

2. The refrigerating and freezing device according to claim 1, wherein the wiring terminals are configured to be respectively fixed to and conductively connected with the metal container body and the bottom steel by fasteners.

3. The refrigerating and freezing device according to claim 1, wherein the heating unit further comprises:

a radiating antenna, disposed in the metal container body to generate electromagnetic waves of a corresponding frequency in the metal container body according to an electromagnetic wave signal.

4. The refrigerating and freezing device according to claim 3, wherein the at least another part of the heating unit is disposed in the compressor chamber to facilitate heat dissipation.

5. The refrigerating and freezing device according to claim 4, further comprising:

a heat dissipation fin, configured to be thermally connected with the heating unit to increase a heat dissipation area, and two lateral side walls of the compressor chamber being respectively provided with an air vent to allow ambient air to enter the compressor chamber and exchange heat with the heat dissipation fin.

* * * * *

UNITED STATES PATENT AND TRADEMARK OFFICE
CERTIFICATE OF CORRECTION

PATENT NO. : 12,298,074 B2
APPLICATION NO. : 17/420590
DATED : May 13, 2025
INVENTOR(S) : Haijuan Wang et al.

Page 1 of 1

It is certified that error appears in the above-identified patent and that said Letters Patent is hereby corrected as shown below:

In the Claims

In Column 10, Line 11, Claim 4, delete "wherein the" and insert -- wherein --, therefor.

Signed and Sealed this
Twenty-sixth Day of August, 2025

Coke Morgan Stewart
*Acting Director of the United States Patent and Trademark Office*